March 19, 1968

S. PAPETTI 3,374,258

SILYLAMINE CARBORANES

Filed Sept. 20, 1963

FORMULA I

○ BORON
◉ CARBON
◉ NITROGEN
◉ SILICON
○ HYDROGEN ON NITROGEN
  (HYDROGEN ATOMS ON BORON
   OMITTED FOR CLARITY)

INVENTOR.
STELVIO PAPETTI
BY
Walter D. Hunter
AGENT

United States Patent Office 3,374,258
Patented Mar. 19, 1968

3,374,258
SILYLAMINE CARBORANES
Stelvio Papetti, Hamden, Conn., assignor to Olin Mathieson Chemical Corporation, a corporation of Virginia
Filed Sept. 20, 1963, Ser. No. 310,421
2 Claims. (Cl. 260—448.2)

ABSTRACT OF THE DISCLOSURE

Nitrogen-containing organoboron compounds are prepared by reacting a silicon-containing organoboron compound of the formula:

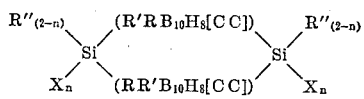

Figure 1:
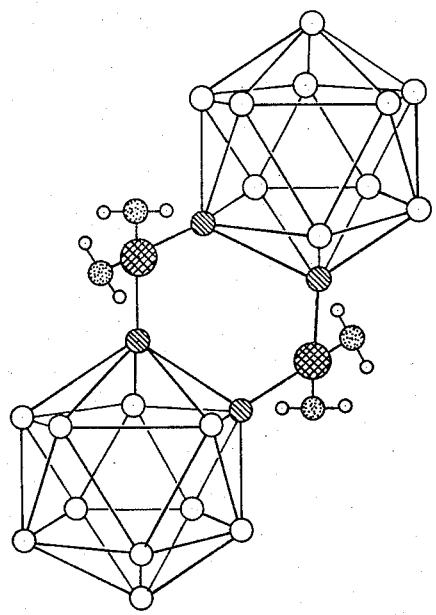

wherein R and R' are each hydrogen or an alkyl, R'' is alkyl or an aryl radical, X is a halogen and $n$ is the integer 1 or 2, with a compound of the formula:

$$NH_2R'''$$

wherein R''' is hydrogen, phenyl, or an alkyl radical.

---

This invention relates to novel nitrogen-containing organoboron compounds and to a process for their preparation.

The novel compounds of this invention have the formula:

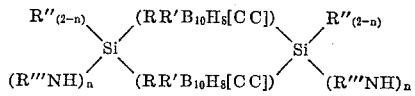

wherein R and R' are each selected from the group consisting of hydrogen or an alkyl radical having from 1 to 5 carbon atoms, R'' is selected from the group consisting of an alkyl radical having from 1 to 5 carbon atoms or an aryl radical having not more than 10 carbon atoms and R''' is selected from the group consisting of hydrogen, phenyl or an alkyl group having from 1 to 8 carbon atoms, and $n$ is the integer 1 or 2.

The novel organoboranes of this invention are prepared by reacting a silicon-containing organoboron compound of the formula:

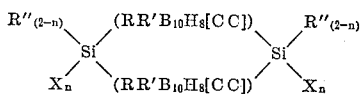

wherein R and R' are each selected from the group consisting of hydrogen or an alkyl radical having from 1 to 5 carbon atoms, R'' is selected from the group consisting of an alkyl radical having from 1 to 5 carbon atoms or an aryl radical having not more than 10 carbon atoms, X is a halogen, said halogen being selected from the group consisting of chlorine, bromine and iodine and $n$ is the integer 1 or 2, with a compound of the formula:

$$NH_2R'''$$

wherein R''' is selected from the group consisting of hydrogen, phenyl, or an alkyl group having from 1 to 8 carbon atoms. The reaction is carried out in the presence of an inert organic solvent which can be benzene, toluene, xylene, petroleum ether, dioxane, tetrahydrofuran, dimethylether of diethylene glycol, etc. The lower dialkyl ethers such as diethylether, di-n-propyl ether, ethyl n-propyl ether, di-isopropyl ether, di-n-amyl ether, etc. can also be utilized in the process of this invention.

The reaction proceeds according to the following equation:

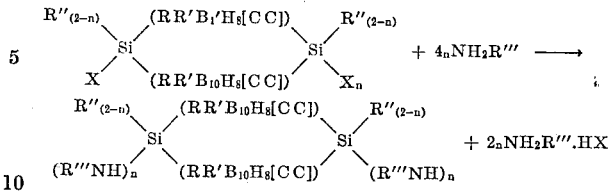

wherein R, R', R'', R''', X and $n$ have the same meaning as previously described.

Although the reaction proceeds in a satisfactory manner at room temperature, temperatures of from about −20° C. to about +80° C. can be utilized, if desired. The preferred reaction temperature is from about −10° C. to about +50° C. Generally the reaction time will vary from about 0.2 to about 3 hours or more depending upon the particular reactants and reaction conditions employed. Usually the process of this invention is operated at atmospheric pressure, however pressures varying from subatmospheric up to about +5 atmospheres or more can be used. Although stoichiometric quantities of the reactants are usually employed, in order to promote completion of the reaction an excess of the nitrogen-containing reactant in an amount of from about 1.5 to 4 times or more of the stoichiometric requirement can be utilized.

When a nitrogen-containing compound which is a gas at room temperature is employed (e.g., ammonia or monomethylamine), it is merely passed into a solution of the silicon-containing organoboron starting material dissolved in the inert organic solvent. If a liquid nitrogen-base compound is utilized for example, monopropylamine, it is added directly to the silicon-containing organoboron compound or, alternatively, it can be first dissolved in an inert organic solvent and then introduced into the reaction mixture.

During the course of the reaction the hydrohalide salt formed precipitates from the reaction mixture and can be removed by filtration, centrifugation or any other suitable method. Recovery of the product can then be accomplished by evaporation of the filtrate to dryness. Recrystallization of the crude product thus obtained from solvents such as dioxane, petroleum ether, benzene, toluene, xylene, etc., yields the pure nitrogen-containing, organoboron product.

The novel silicon-containing organoboron compounds utilized as starting materials in the process of this invention can be prepared by the process set forth in Papetti application Ser. No. 310,423, filed Sept. 20, 1963, for Composition and Process. For example, the compound:

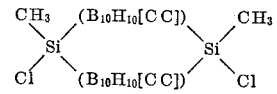

can be prepared by reacting 0.071 mole of carborane ($B_{10}H_{10}[C(H)C(H)]$) successively with 0.149 mole butyl lithium and 0.0782 mole of bis(dichloro methylsilyl) carborane in diethyl ether and recovering the product which precipitates from the reaction mixture during the course of the reaction. Other useful silicon-containing organoboron starting materials include, for example,

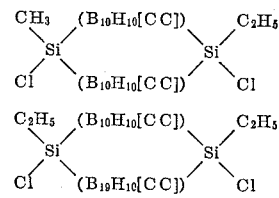

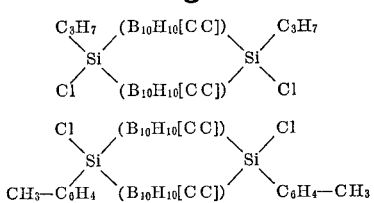

and

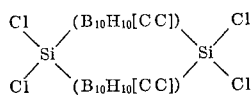

The corresponding bromine and iodine derivatives are also suitable as starting compounds for the process of this invention.

Useful nitrogen-containing compounds include ammonia, aniline, monomethylamine, monoethylamine, mono-n-propylamine, monoisoamylamine, etc.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The process of this invention is illustrated by the following examples which are to be considered not limitative.

In the examples the term "moles" signifies "gram moles."

*Example I*

A total 1.1 g. (0.0228 mole) of the compound:

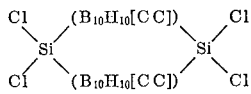

was dissolved in 50 ml. of benzene and ammonia was slowly passed through the solution for 35 minutes at room temperature. During this period a precipitate formed. The mixture was filtered, the filtrate was evaporated to dryness and the residue was recrystallized from boiling dioxane to give an essentially quantitative yield of the product (A) (M.P. 347–9° C., d.).

*Analysis.*—Calc'd for $C_4H_{28}B_{20}N_4Si$: N, 13.64; B, 53.47; Si, 13.87. Found: N, 12.88; B, 53.00; Si, 13.83.

Product A has the formula:

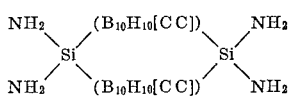

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided boron-containing material can be admixed with a high solids content solution of partially condensed urea-formaldehyde or phenol-formaldehyde resin, the proportions being such that the amount of resin is about 5 to 10 percent by weight based upon the weight of oxidizer and the boron compound. The ingredients can be thoroughly mixed with simultaneous removal of solvent, and following this the solvent free mixture can be molded into the desired shape as by extrusion. Thereafter, the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

The structural formula of Compound A prepared in Example I is shown in the figure.

What is claimed is:

1. A compound of the formula:

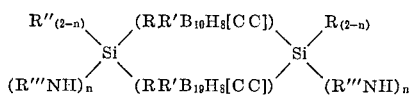

wherein R and R' are each selected from the group consisting of hydrogen or an alkyl radical having from 1 to 5 carbon atoms, R'' is selected from the group consisting of an alkyl radical having from 1 to 5 carbon atoms and an aryl radical having not more than 10 carbon atoms and R''' is selected from the group consisting of hydrogen, phenyl and an alkyl radical having from 1 to 8 carbon atoms and $n$ is an integer of from 1 to 2 inclusive.

2.

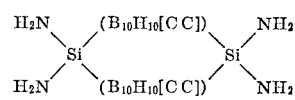

References Cited

Eaborn: "Organosilicon Compounds," Academic Press Inc., New York (1960), pp. 339–341.

TOBIAS E. LEVOW, *Primary Examiner.*

HELEN M. McCARTHY, *Examiner.*

P. F. SHAVER, *Assistant Examiner.*